J. H. ELWARD.
Harvesters.

No. 141,867.            Patented August 19, 1873.

Attest:
Aleps Mahon
J. F. Thomas

Inventor:
John H. Elward
by A. M. Smith
attorney

UNITED STATES PATENT OFFICE.

JOHN H. ELWARD, OF ST. PAUL, MINNESOTA.

IMPROVEMENT IN HARVESTERS.

Specification forming part of Letters Patent No. 141,867, dated August 19, 1873; application filed March 13, 1873.

*To all whom it may concern:*

Be it known that I, J. H. ELWARD, of St. Paul, in the county of Ramsey and State of Minnesota, have invented certain new and useful Improvements in Harvesting-Machines, of which the following is a full, clear, and exact description, reference being had to the accompanying drawings making part of this specification, in which—

Figure 1:
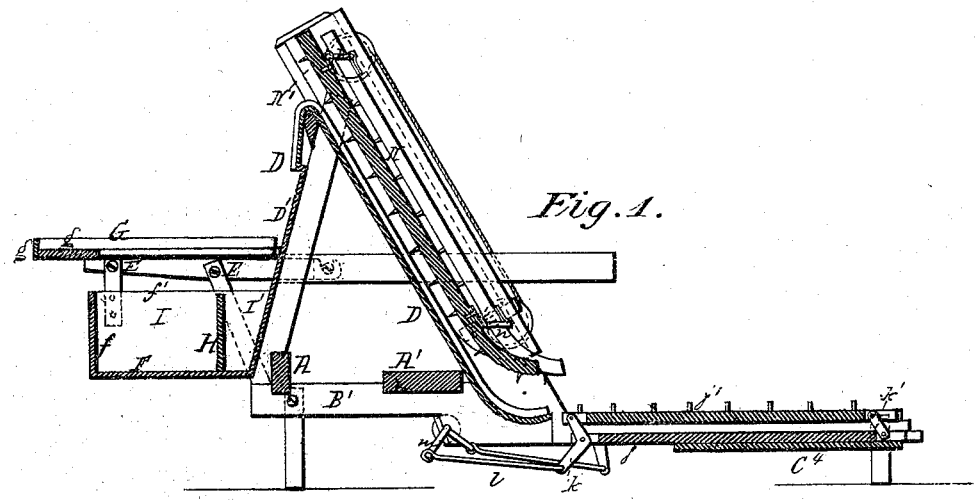
Figure 2:
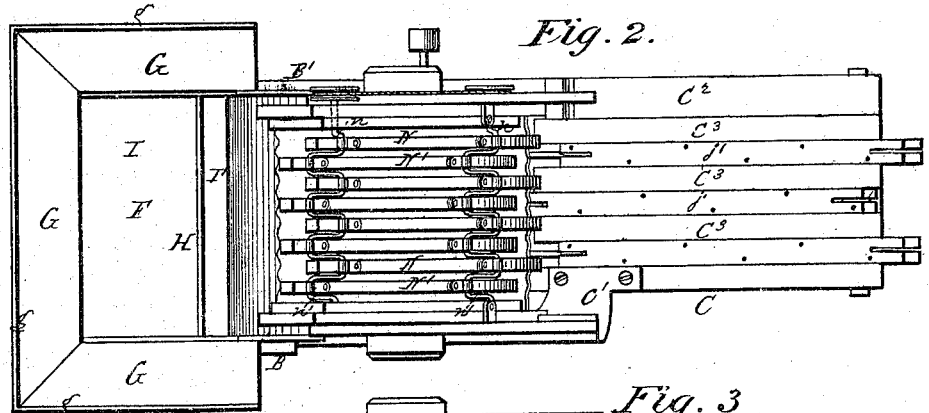
Figure 3:
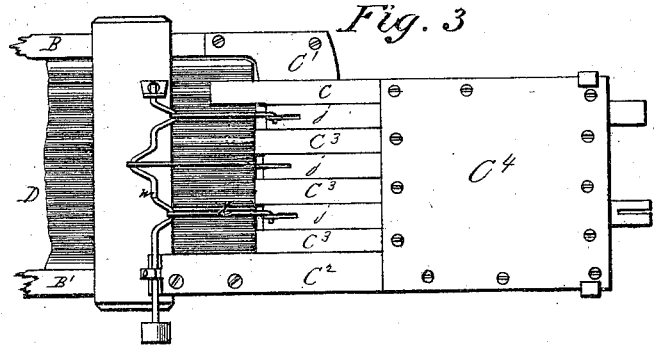

Figure 1 represents a vertical transverse section through so much of the machine as is necessary to show my improvements. Fig. 2 is a plan or top view of the same, and Fig. 3 is a bottom view of part of the same.

Similar letters of reference indicate similar parts wherever used.

My invention relates to a novel construction of the binders' platform and grain-receptacle, and also of the devices for effecting the removal of the grain from the platform; and the invention consists, first, in providing the close grain-receptacle for the straw and shattered grain and heads, and which also constitutes the binders' platform, with a vertical partition, forming two compartments, one of which serves to receive and hold the grain in compact form for the binders and to retain the shattered grain and heads, and the other as a binders' platform, and also to receive and retain the grain shattered out during the process of binding; and, second, the invention consists in the employment of toothed reciprocating rake-bars, connected with lower reciprocating parallel bars by means of parallel links, and operated by elbow or bell-crank levers, which impart a rising-and-falling movement to the rake-bars, while at the same time a reciprocating movement is imparted to said rake-bars for moving the grain toward and discharging it at the inner end of said platform, as hereinafter set forth.

In the accompanying drawings, A A' represent the longitudinal frame-bars, between which the main drive-wheel (not shown) is mounted; B B', the front and rear transverse bars; C, the finger or front-platform bar, connected with the bar B by means of an intermediate shoe at $C^1$; and $C^2$, a rear bar, which, in connection with the finger-bar, an outer longitudinal divider-bar, (not shown,) and, where preferred, with intermediate bars or slats $C^3$ and bottom $C^4$, constitute the platform of the machine, which may be provided with the outer divider and supporting-wheel applied in any usual or desired manner. A triangular frame is built upon the main frame around the drive-wheel, and closed in upon its inclined faces by a continuous shield, D D', over which the grain is carried from the inner end of the grain-platform on one side of the drive-wheel to and deposited in the grain-receptacle upon the other side of said wheel. This grain-receptacle is mounted in overhanging pivoted supports E in front and rear of the triangular frame, or it may be attached to and supported by the main frame in any suitable or desired manner, and is constructed as follows: F is the floor or platform, provided with upright sides $f$ $f'$ D', which form a box or receptacle for the grain, these sides extending up to, or nearly to, binders' tables G, which overhang three sides—the front, rear, and outer side of the receptacle, as shown in Figs. 1 and 2. The inner side D' of the box may be extended upward upon the outside braces of the triangular elevator-frame, and made to form a portion of the continuous shield, or it may be connected therewith by a hinged intermediate portion, as preferred. H is a longitudinal partition-board dividing the receptacle into two compartments, I I', the inner one of which, I', receives all the straw, loose heads, and grain which pass over the shield D D', and serves to hold the straw in compact shape to be taken out and bound upon the tables G; and the other, I, in which the binders stand, serves to receive and retain the grain shattered in the process of binding on the tables G, the tables G being provided with an outer vertical lip or rim, $g$, which prevents the grain from escaping at the outer edge. The grain-platform has mounted upon it a series of sliding bars, $j$, arranged either side by side or separated by intermediate stationary platform bars or slats $C^3$, as preferred. Directly above these bars $j$ are placed parallel tooth-bars or rake-heads $j'$, connected therewith by links $k$ $k'$, by the movement of which the bars $j$ $j'$ are made to act like the bars of a parallel rule. The inner link $k$ forms one arm of a bell-crank or elbow-lever, the other arm of which extends downward, and is connected, by a link or rod, $l$, with a crank-shaft, $m$, (see Figs. 1 and 3,) and these bars $jj'$, arranged in several sets or series of two or three or more in each, are connected with corresponding series of cranks on the shaft $m$, the cranks of one series being placed at an angle of ninety, one hundred and twenty, or one hundred and eighty degrees from each other, according to the number of series employed.

The crank-shaft $m$ is driven in any convenient manner, and operates the toothed rake-bar $j'$ as follows, viz.: When the crank commences its movement away from the platform its first action is to tend to straighten the connection formed by rod $l$ and the lower arm of the elbow-lever between the crank and the pivotal support of the elbow-lever $k$, and in so doing the arms or links $kk'$ are thrown into a vertical position, raising the toothed bars $j'$ above the face of the platform, when the continued movement of the crank draws both bars $jj'$ inward, carrying with them the grain resting upon the elevated bars $j'$ until the crank has reached the inner extent of its throw, when, upon commencing its return movement, it acts in a reverse direction on the elbow-lever and links $kk'$, closing the parallel bars and causing the bars $j$ and their teeth to drop below the surface of the platform on the elevated bars of another series commencing their inward movement.

By the employment of two or more series of bars $j'$, acting alternately or in succession, as explained, the movement of the grain inward may be made nearly or quite continuous. The grain thus carried to the inner end of the platform is deposited upon the lower curved end of shield D, from which point it may be carried up over the shield by a gang of rakes, N N', arranged in two or more series, and operated by cranks $n n'$, as shown in the drawings, or by elevating-aprons, constructed and arranged in any usual or desired manner, as preferred.

Parts of the machine not particularly referred to may be constructed and arranged in any usual or desired manner.

Having now described my invention, what I claim as new, and desire to secure by Letters Patent, is—

1. The binders' stand I and grain-receptacle I', separated by the partition H, substantially as and for the purpose set forth.

2. The lifting and reciprocating rake-bars $j'$, connected with the parallel bars $j$, and operated by the means and substantially as described.

JOHN H. ELWARD.

Witnesses:
 EDM. F. BROWN,
 ALEXR. MAHON.